(12) United States Patent
Chida et al.

(10) Patent No.: US 7,497,467 B2
(45) Date of Patent: Mar. 3, 2009

(54) AIRBAG APPARATUS

(75) Inventors: Yusuke Chida, Utsunomiya (JP); Makoto Nagai, Sakura (JP); Hiroyuki Nozaki, Utsunomiya (JP); Yuu Sasaki, Kawachi-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/786,371

(22) Filed: Apr. 11, 2007

(65) Prior Publication Data

US 2007/0241546 A1   Oct. 18, 2007

(30) Foreign Application Priority Data

Apr. 12, 2006   (JP) ............................. 2006-109621
Apr. 12, 2006   (JP) ............................. 2006-109622
Jan. 16, 2007   (JP) ............................. 2007-006792

(51) Int. Cl.
*B60R 21/30* (2006.01)

(52) U.S. Cl. ........................................ 280/739

(58) Field of Classification Search ................. 280/736, 280/740, 741, 731, 739
See application file for complete search history.

(56) References Cited

U.S. PATENT DOCUMENTS

| | | | | |
|---|---|---|---|---|
| 5,496,063 A | * | 3/1996 | Conlee et al. ................ | 280/739 |
| 7,066,490 B2 | * | 6/2006 | Yamamoto et al. ........ | 280/743.2 |
| 7,111,866 B2 | * | 9/2006 | Abe et al. .................... | 280/729 |
| 7,125,043 B2 | * | 10/2006 | Amamori ................. | 280/743.1 |
| 7,152,875 B2 | * | 12/2006 | Kai .............................. | 280/739 |
| 7,198,290 B2 | * | 4/2007 | Yamada et al. .............. | 280/731 |
| 2005/0098991 A1 | * | 5/2005 | Nagai et al. .............. | 280/743.1 |

FOREIGN PATENT DOCUMENTS

JP        09315246 A    * 12/1997
JP        2005-199987     7/2005

* cited by examiner

*Primary Examiner*—Faye M. Fleming
(74) *Attorney, Agent, or Firm*—Carrier, Blackman & Associates, P.C.; William D. Blackman; Joseph P. Carrier

(57) ABSTRACT

An airbag apparatus includes an air bag, the airbag including an inflator opening, a vent hole provided at a side of the inflator opening, and a vent hole cover which closes the vent hole, wherein the vent hole cover has a strip-shaped closure part which covers the vent hole, and an extending part which extends towards the inflator opening from a longitudinal intermediate part of the closure part, and both ends of the closure part are joined to the airbag at rupture joining parts which are configured to rupture at the time of deployment of the airbag.

12 Claims, 17 Drawing Sheets

AIRBAG APPARATUS

BACKGROUND OF THE INVENTION

1. Field of the Invention

The present invention relates to an airbag apparatus for the protection of occupants.

Priority is claimed on Japanese Patent Application No. 2006-109621 filed Apr. 12, 2006, Japanese Patent Application No. 2006-109622 filed Apr. 12, 2006, and Japanese Patent Application No. 2007-6792 filed Jan. 16, 2007, the entire contents of which are incorporated herein by reference.

2. Description of the Related Art

In some airbag apparatuses which deploy an airbag in the interior of a vehicle with the gas supplied from an inflator to restrain an occupant at the time of collision of a vehicle, a vent hole is provided, in order to prevent the internal pressure of the airbag from rising excessively, and this vent hole opens during deployment of the airbag.

Also, in some airbag apparatuses, in order to control the volume expansion and internal pressure of an airbag, rupture joining parts which are ruptured during deployment are provided in advance in the airbag, and the volume of the airbag is increased gradually by the rupture of the rupture joining parts.

For example, JP-A-2005-199987 discloses an airbag apparatus in which ends of a vent hole cover to close a vent hole are joined to an airbag by rupture joining parts, and when the rupture joining parts are ruptured at the time of deployment of the airbag, the vent hole cover deviates from the vent hole to open the vent hole.

In this case, it is necessary to prevent the position of the vent hole cover from deviating during the deployment of the airbag before the rupture joining parts are ruptured, and to prevent the vent hole from opening. In connection with this matter, JP-A-2005-199987 discloses sewing the vent hole cover to the airbag in the vicinity of the vent hole.

However, since the conventional techniques of preventing the positional deviation of the vent hole cover increase the sewing parts and lower productivity, there is a need for improvement.

Also, since it takes time and effort to arrange the vent hole cover in the manufacture of an airbag, there is another need for improvement.

SUMMARY OF THE INVENTION

Thus, the present invention provides an airbag apparatus capable of preventing any positional deviation of a vent hole cover which closes a vent hole, and improving productivity.

The following means is adopted in the airbag apparatus according to the present invention in order to solve the above problems.

The present invention provides an airbag apparatus including an airbag having an inflator opening, a vent hole provided at a side of the inflator opening, and a vent hole cover which closes the vent hole. The vent hole cover has a strip-shaped closure part which covers the vent hole, and an extending part which extends towards the inflator opening from a longitudinal intermediate part of the closure part, and both ends of the closure part are joined to the airbag by rupture joining parts which are ruptured at the time of deployment of the airbag.

By this configuration, it is possible to prevent the vent hole cover from deviating in position at the time of manufacture or deployment of the airbag, and closure of the vent hole can be maintained until the ends of the vent hole cover deviate from the airbag.

In the airbag apparatus, the extending part may cover the periphery of the inflator opening.

By this configuration, the vent hole cover can be easily set in the airbag at the time of manufacture of the airbag apparatus. Also, the extending part functions as a reinforcing member which reinforces the airbag around the inflator opening.

In the airbag apparatus, the ends of the closure part may be made narrower at the rupture joining parts.

By this configuration, the friction which occurs when the vent hole cover slips out from the vent hole can be reduced.

The airbag apparatus may further include a positioning means which positions the vent hole cover with respect to the airbag when both ends of the closure part are joined to the airbag.

By this configuration, the vent hole cover can be easily arranged in a proper position of the airbag, and the fact that the vent hole cover is arranged in a proper position can be checked easily. Thus, the rupture joining parts can be formed by reliably sawing the airbag and the vent hole cover.

In the airbag apparatus, the positioning means may be configured by making the color of the airbag different from the color of the vent hole cover. By this configuration, the position of the vent hole cover to be arranged inside the airbag can be determined appropriately.

In the airbag apparatus, the positioning means may have marks provided in parts of the airbag where the vent hole cover is to be arranged.

By this configuration, the relative position of the airbag and the vent hole cover can be adjusted appropriately.

In the airbag apparatus, the positioning means may have marks provided in the vicinity of the ends of the vent hole cover.

By this configuration, the ends of the vent hole cover can be easily arranged in desired positions of the airbag.

The airbag apparatus may further include an airbag cover which stores the airbag in a folded state. Here, the vent hole is formed in a position where the vent hole does not interfere with a deployment locus of the airbag cover in a deployed state of the airbag.

By this configuration, at the time of deployment of the airbag, it is possible to prevent the vent hole from interfering with the deployed airbag cover, discharge of air from the vent hole can be performed stably, and the load characteristics of the airbag can be stabilized.

In the airbag apparatus, the airbag may be provided in the steering wheel of a vehicle, and the vent hole may be located inside a grip of the steering wheel in a deployed state of the airbag.

By this configuration, at the time of deployment of the airbag, it is possible to prevent the vent hole from interfering with the grip of the steering wheel, discharge of air from the vent hole can be performed stably, and the load characteristics of the airbag can be stabilized.

Moreover, the present invention provides an airbag apparatus including an airbag having an inflator opening, a vent hole provided at a side of the inflator opening, and a vent hole cover which closes the vent hole. The vent hole cover has three or more apexes, and the apexes are joined to the airbag by rupture joining parts which are ruptured at the time of deployment of the airbag.

By this configuration, it is possible to prevent the vent hole cover from deviating in position at the time of manufacture or deployment of the airbag, and closure of the vent hole can be maintained until the apexes of the vent hole cover deviate from the airbag.

In the airbag apparatus, each of the apexes may be provided in a position where at least part of the vent hole deviates from a diagonal line connecting the apexes.

By this configuration, the vent hole can be opened when at least one of the apexes of the vent hole cover joined to the airbag deviates from the airbag.

In the airbag apparatus, at least two of the apexes of the vent hole cover to be fixed may be located on both sides of the inflator opening on a substantially straight line passing through the inflator opening.

By this configuration, deviation of the vent hole cover in a direction intersecting the straight line connecting the two apexes on both sides of the inflator opening can be minimized.

In the airbag apparatus, the ends of the vent hole cover may be made narrower at the rupture joining parts.

By this configuration, the friction which occurs when the vent hole cover slips out from the vent hole can be reduced.

According to the present invention, the vent hole cover does not deviate in position at the time of manufacture or deployment of the airbag. As a result, since closure of the vent hole can be maintained until the ends of the vent hole cover deviate from the airbag, the internal pressure and deployment of the airbag can be controlled appropriately.

Also, according to the present invention, since the vent hole cover can be easily set in the airbag at the time of manufacture of the airbag apparatus, the productivity of the airbag apparatus improves.

Also, since the extending part functions as a reinforcing member which reinforces the airbag around the inflator opening, the periphery of the inflator opening can be reinforced without increasing the number of parts.

Also, according to the present invention, the friction which occurs when the vent hole cover slips out from the vent hole can be reduced.

Also, according to the present invention, the vent hole cover can be easily arranged in a proper position of the airbag, and the fact that the vent hole cover is arranged in a proper position can be checked easily. Thus, the rupture joining parts can be formed by reliably sawing the airbag and the vent hole cover, and gas can be stably discharged from the vent hole at the time of deployment of the airbag.

Also, according to the present invention, the position of the vent hole cover to be arranged inside the airbag can be determined appropriately.

Also, according to the present invention, the relative position of the airbag and the vent hole cover can be adjusted appropriately.

Also, according to the present invention, the ends of the vent hole cover can be easily arranged in desired positions of the airbag.

Also, according to the present invention, discharge of air from the vent hole can be performed smoothly and stably, and the load characteristics of the airbag can be stabilized.

Also, according to the present invention, the vent hole cover does not deviate in position at the time of manufacture or deployment of the airbag. As a result, since closure of the vent hole can be maintained until the apexes of the vent hole cover deviate from the airbag, the internal pressure and deployment of the airbag can be controlled appropriately.

Also, according to the present invention, the vent hole can be opened if at least one of the apexes of the vent hole cover joined to the airbag deviates from the airbag. Thus, the vent hole can be reliably opened with suitable timing, and the internal pressure of the airbag can be controlled appropriately.

Also, according to the present invention, deviation of the vent hole cover in a direction intersecting a straight line connecting the two apexes on both sides of the inflator opening can be minimized.

Also, according to the present invention, the friction which occurs when the vent hole cover slips out from the vent hole can be reduced.

DETAILED DESCRIPTION OF THE INVENTION

Hereinafter, a first embodiment of an airbag apparatus according to the present invention will be described with reference to the drawings of FIGS. 1 to 11. In addition, an airbag apparatus of each embodiment to be described below is a mode of an airbag apparatus stored in a steering wheel for the driver of a vehicle, and the "front and rear" in the following description is the same as the front and rear in the vehicle body.

Figure 1:
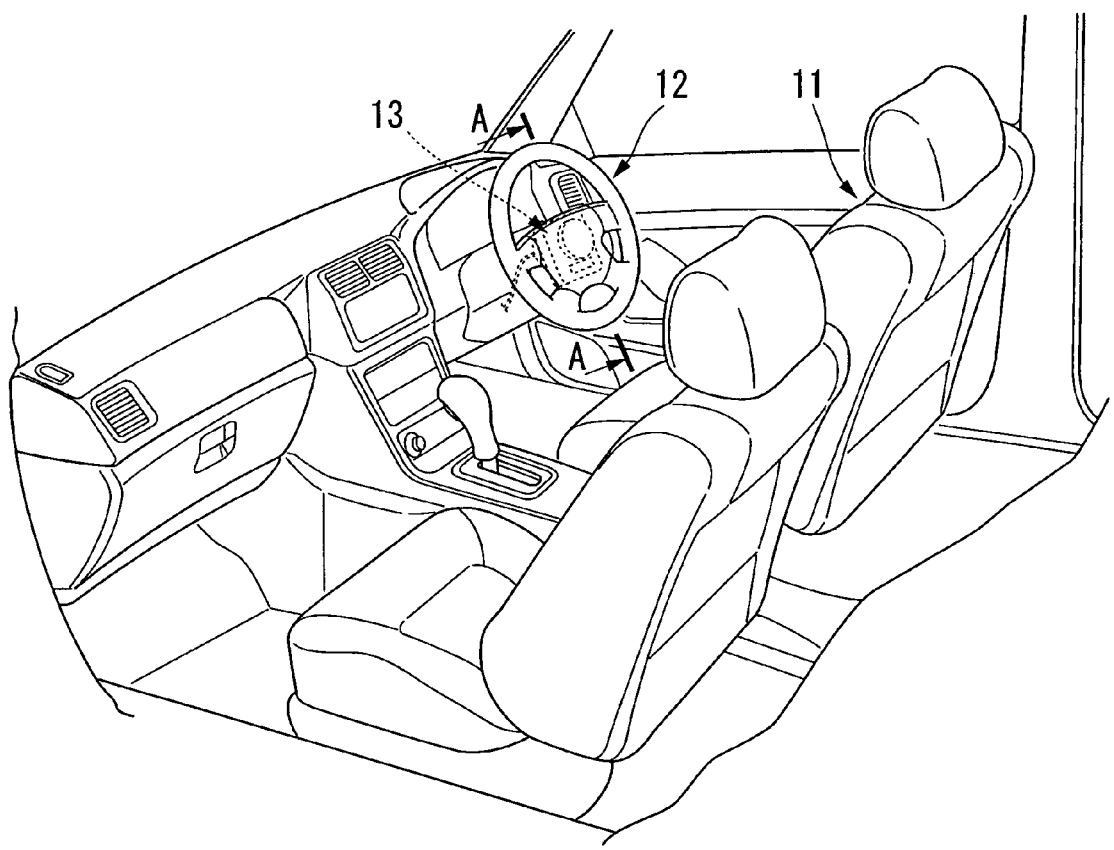
FIG. 1 is a perspective view showing the interior of a vehicle equipped with an airbag apparatus according to the present invention.

As shown in FIG. 1, an airbag module 13 of the airbag apparatus is stored inside a steering wheel 12 arranged in front of a driver's seat 11.

Figure 2:
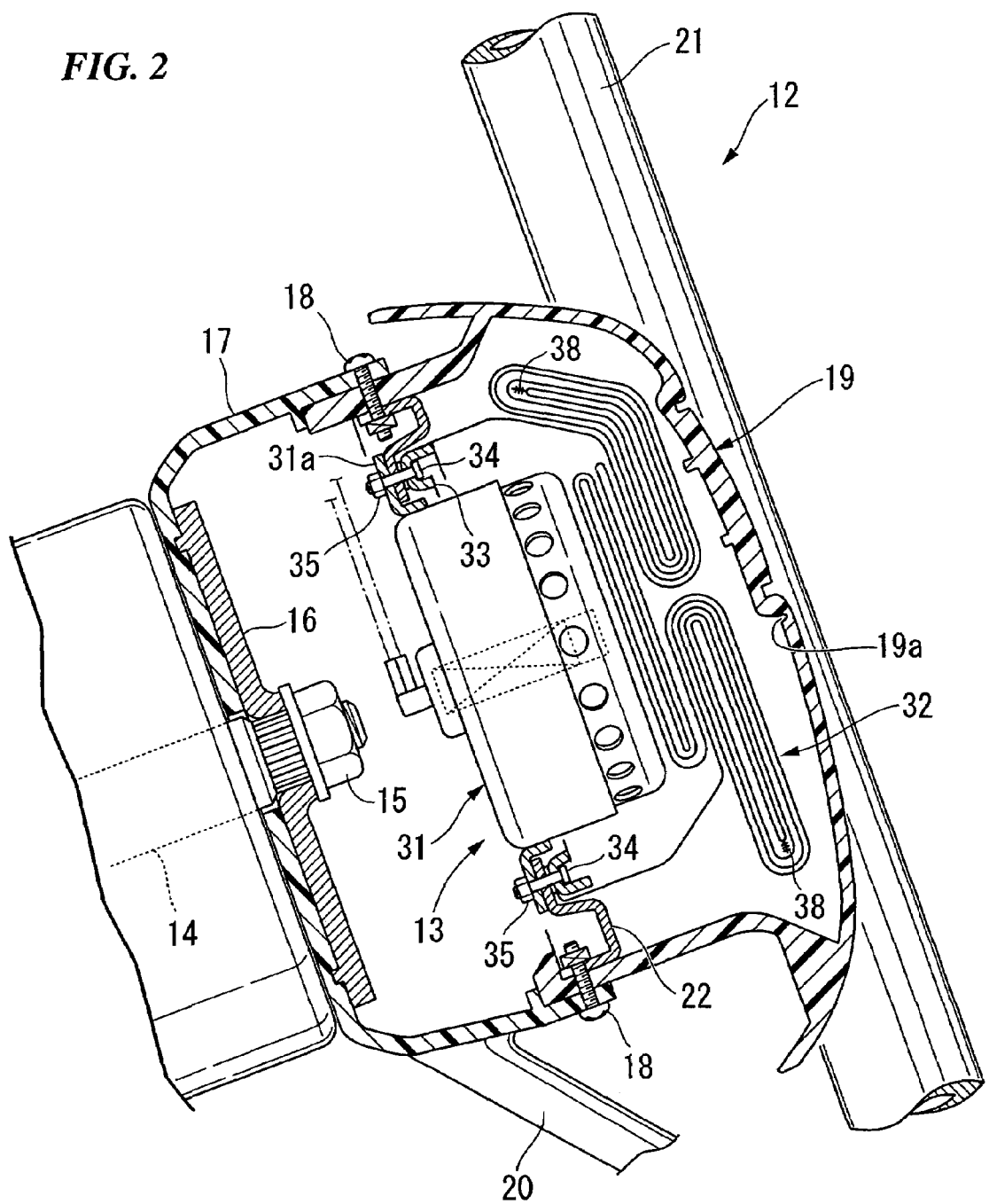
FIG. 2 is a cross-sectional view taken along the line A-A of FIG. 1.

FIG. 2 is a cross-sectional view taken along the line A-A of FIG. 1. As shown in FIG. 2, as for the steering wheel 12, a boss 16 is fixed to a rear end of a steering shaft 14 with a nut 15, and a cup-shaped front cover 17 is fixed to the boss 16. A rear cover 19 is fixed to a peripheral edge of the front cover 17 with a plurality of bolts 18 so as to close the front cover 17. A plurality of radially extending spokes 20 are attached to an outer peripheral surface of the front cover 17, and a steering wheel body (grip) 21 is supported by the spokes 20.

A retainer 22 is fastened to an inner peripheral surface of the rear cover 19 with the bolts 18, and the airbag module 13 is supported by the retainer 22. The front cover 17 and the rear cover 19 constitute an airbag cover which houses the airbag module 13.

Figure 8:
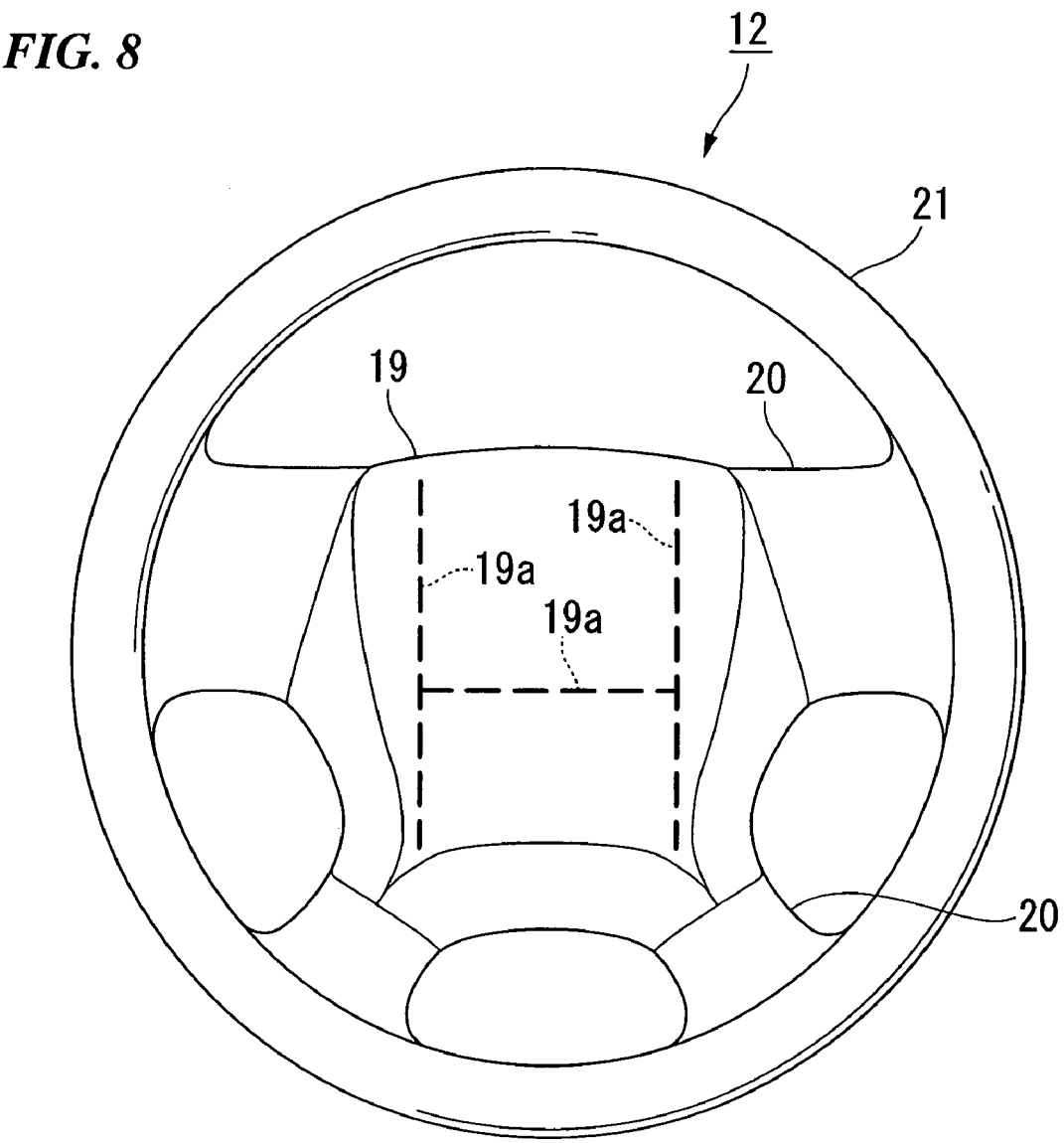
FIG. 8 is a front view of a steering wheel in the first embodiment.

Tear lines 19a for promoting rupture of the rear cover 19 are formed in an inner surface of the rear cover 19. As shown in FIG. 8, when the rear cover 19 is seen from the front, the tear lines 19a are formed substantially in the shape of the letter "H,". The rear cover 19 is ruptured along the tear lines 19a, and subsequently is divided into an upper and lower part in the drawing and thereby becomes deployed.

The airbag module 13 includes an inflator 31 filled with propellant which generates high pressure gas by combustion, an airbag 32 which is constructed by sewing ground fabric, and is inflated by introducing the high pressure gas generated by the inflator 31, and a stop ring 33 which fixes a base of the airbag 32. A flange 31a of the inflator 31 and the stop ring 33 are placed on the front and the rear faces of the retainer 22, respectively, and are fastened to them with a plurality of bolts 34 and nuts 35. The base of the airbag 32 is fixed in a state where it is sandwiched between the rear face of the retainer 22 and the front face of the stop ring 33.

Figure 3:
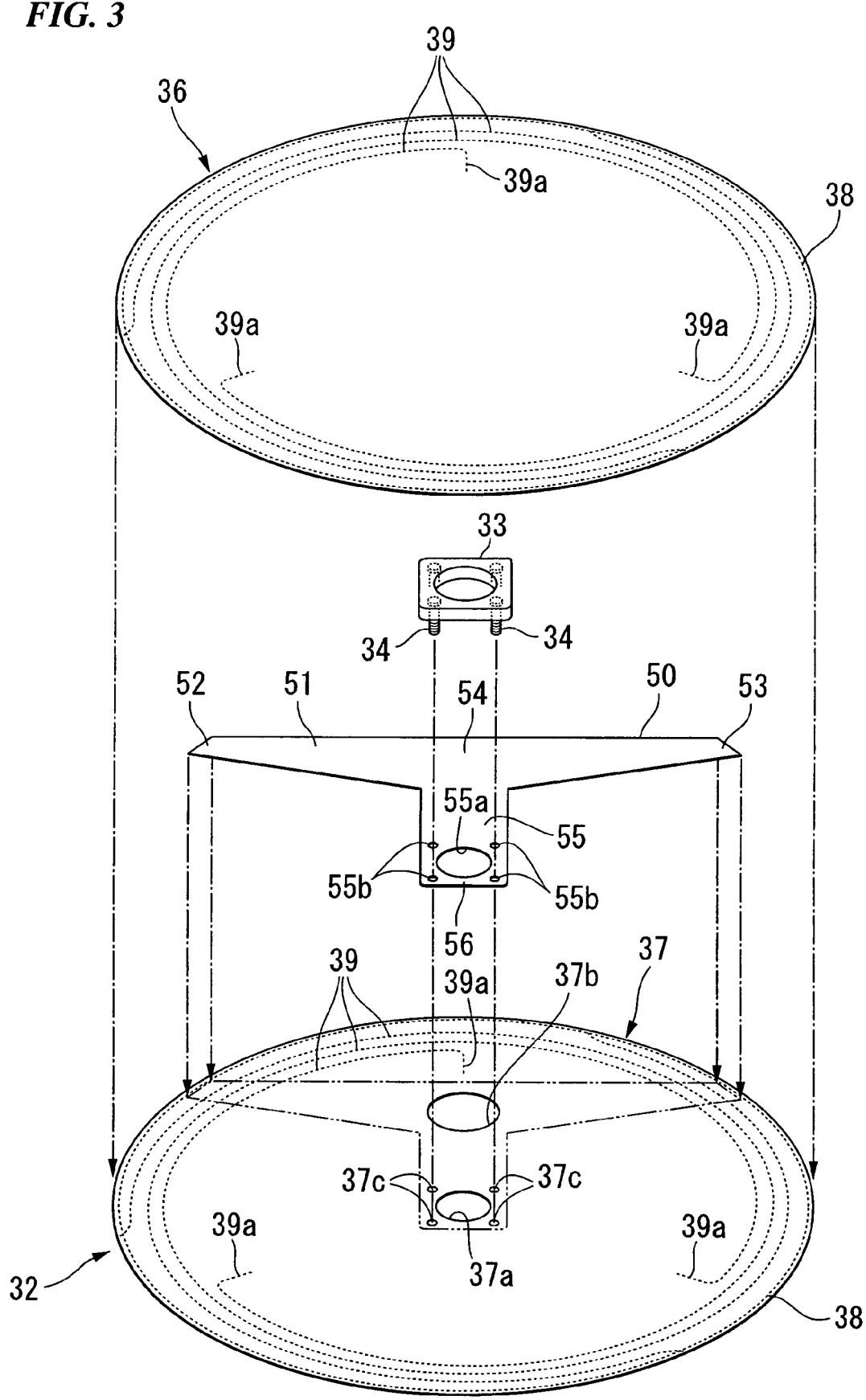
FIG. 3 is an exploded perspective view of an airbag in a first embodiment of the airbag apparatus according to the present invention.

As shown in FIG. 3, the circular airbag 32 includes a first ground fabric 36 on the rear side (the side which faces an occupant), and a second ground fabric 37 which is provided on the front face of the first ground fabric, and peripheries of the first ground fabric 36 and the second ground fabric 37 are sewn integrally by sewing parts 38. Also, the layered first ground fabric 36 and second ground fabric 37 are sewn by a plurality of spiral sewing parts (rupture joining parts) 39 inside sewing part 38. Although three spiral sewing parts 39 are provided in the present embodiment, two, four, or more sewing parts may be provided. The peripheral sewing part 38 is securely sewn with a thick thread so that it may not be ruptured at the time of the inflation of the airbag 32, but the three inner spiral sewing parts 39 are weakly sewn with a fine thread so that it can be ruptured at the time of inflation of the airbag 32.

Radial inner ends 39a of the spiral sewing parts 39 are directed to the center of the airbag 32, and stress is concentrated on the radial inner ends 39a at the time of deployment of the airbag 32 to promote rupture initiation of the sewing parts 39.

The second ground fabric 37 is provided with a circular opening (inflator opening) 37a which surrounds the inflator 31, through-holes 37c, for a plurality of bolts 34, which are formed at the periphery of the opening 37a, and a circular vent hole 37b which allows a portion of internal gas to escape at the time of inflation of the airbag 32. The opening 37a is arranged in the center of the second ground fabric 37. The vent hole 37b is arranged at a side of the opening 37a, and is arranged eccentrically from the center of the second ground fabric 37.

Since the second ground fabric 37 is sandwiched between the rear face of the retainer 22 and the front face of the stop ring 33 and fastened with the plurality of bolts 34 as mentioned above, the gas generated by the inflator 31 is supplied into the airbag 32 from the opening 37a in the center of the second ground fabric 37.

Figure 4:
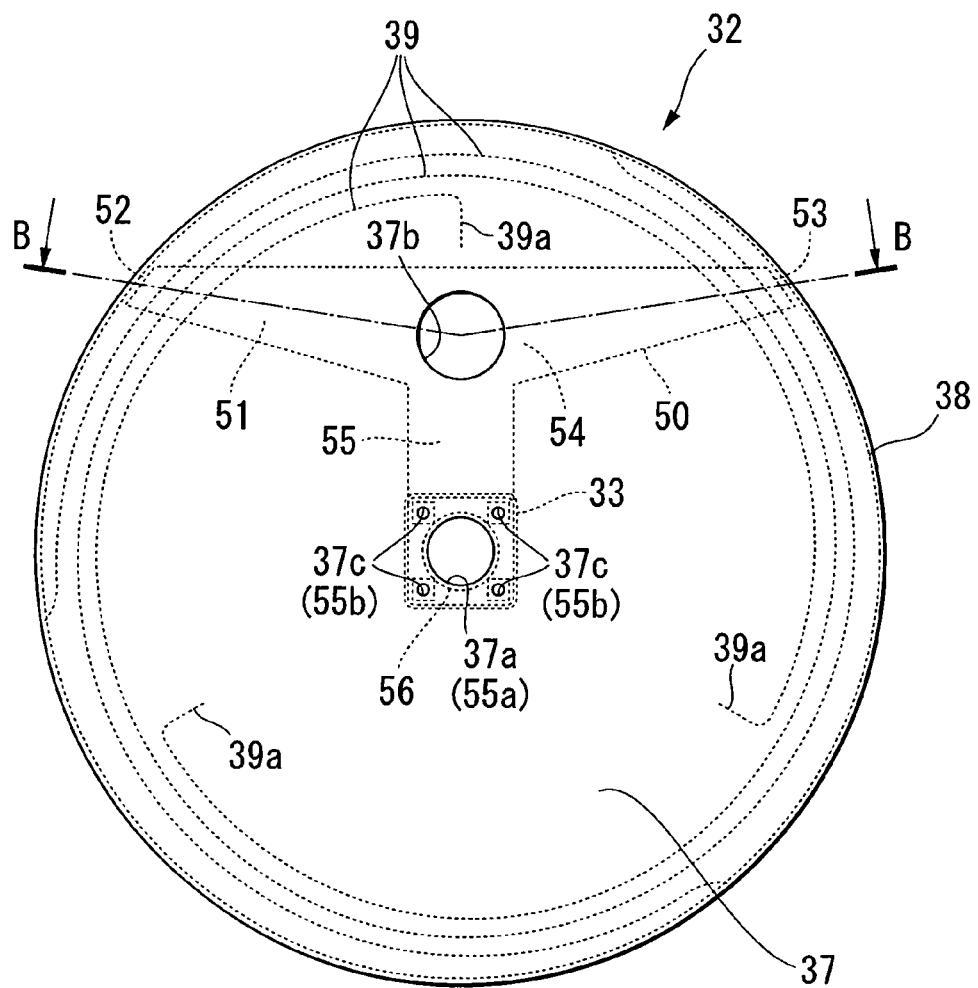
FIG. 4 is a rear view of the airbag in the first embodiment.

The airbag 32 is provided with a vent hole cover 50 which controls the internal pressure thereof. As shown in FIGS. 3 and 4, the vent hole cover 50 is formed substantially in the shape of the letter "T" in plan view, which is composed of linear strap parts. The vent hole cover 50 has a closure part 51 whose both ends 52 and 53 are arranged at the periphery of the airbag 32, and an extending part 55 which extends towards the opening 37a from a longitudinal intermediate part 54 of the closure part 51.

The intermediate part 54 of the closure part 51 is made wider than the vent hole 37b so that it can close the vent hole 37b. The closure part 51 becomes narrower as it approaches both ends 52 and 53 from the intermediate part 54. The vent hole cover 50 is arranged along the inner surface of the second ground fabric 37 in a position where the vent hole 37b can be closed by the intermediate part 54. Both ends 52 and 53 of the closure part 51 are cut into arc s so as to align along the peripheral edges of the first ground fabric 36 and second ground fabric 37, with such a length that they do not reach the sewing parts 38. Both ends 52 and 53 of the closure part 51 are sewn by the three spiral sewing parts 39 which join the first ground fabric 36 and the second ground fabric 37 together.

The extending part 55 is formed with substantially the same width over its entire length. A tip 56 of the extending part 55 is arranged so as to cover the periphery of the opening 37a of the second ground fabric 37. The tip 56 is provided with a hole 55a having the same diameter as the opening 37a and located concentrically with the opening 37a, and a plurality of through-holes 55b arranged around the hole 55a and formed in the positions corresponding to the through-holes 37c of the second ground fabric 37. The tip 56 of the extending part 55 is sandwiched between the rear face of the retainer 22 and the front face of the stop ring 33 along with the second ground fabric 37, and is fastened to the retainer 22 with the bolts 34 along with the second ground fabric 37.

In addition, in the manufacturing process of the airbag 32, after the peripheries of the first ground fabric 36 and the second ground fabric 37 are joined together at the sewing parts 38, the vent hole cover 50 is temporarily placed on the second ground fabric 37, then the airbag is turned inside out, and then the insides of the sewing parts 38 are joined at the spiral sewing parts 39. In order for the vent hole cover 50 not to deviate in position when the airbag 32 is turned inside out, the vent hole cover 50 may be temporarily fixed to the second ground fabric 37 in accordance with a proper position so as to the vent hole 37b is covered, prior to the airbag is turned inside out.

Also, it is confirmed whether both ends 52 and 53 of the vent hole cover 50 are arranged in proper positions of the second ground fabric 37 before the sewing parts 39 are sewn irrespective of the existence or nonexistence of the temporary fixation of the vent hole cover 50. In order to facilitate this confirmation, it is preferable to use the following positioning means or the like, for the vent hole cover 50.

A first positioning means makes the color of the vent hole cover 50 darker than the color of the first ground fabric 36 and the second ground fabric 37. That is, the color of the first ground fabric 36 and the second ground fabric 37 and the color of the vent hole cover 50 are made so as to be different from each other. If the colors are different in this way, an operator can see the vent hole cover 50 arranged between the first ground fabric 36 and the second ground fabric 37 through the first ground fabric 36 or the second ground fabric 37. Therefore, it can be easily checked visually whether or not both ends 52 and 53 of the closure part 51 of the vent hole cover 50 are correctly arranged in the positions where the sewing parts 39 are to be formed. Also, when either of the ends is not arranged in proper position, the position of the vent hole cover 50 can be easily adjusted to a proper position.

Figure 10:
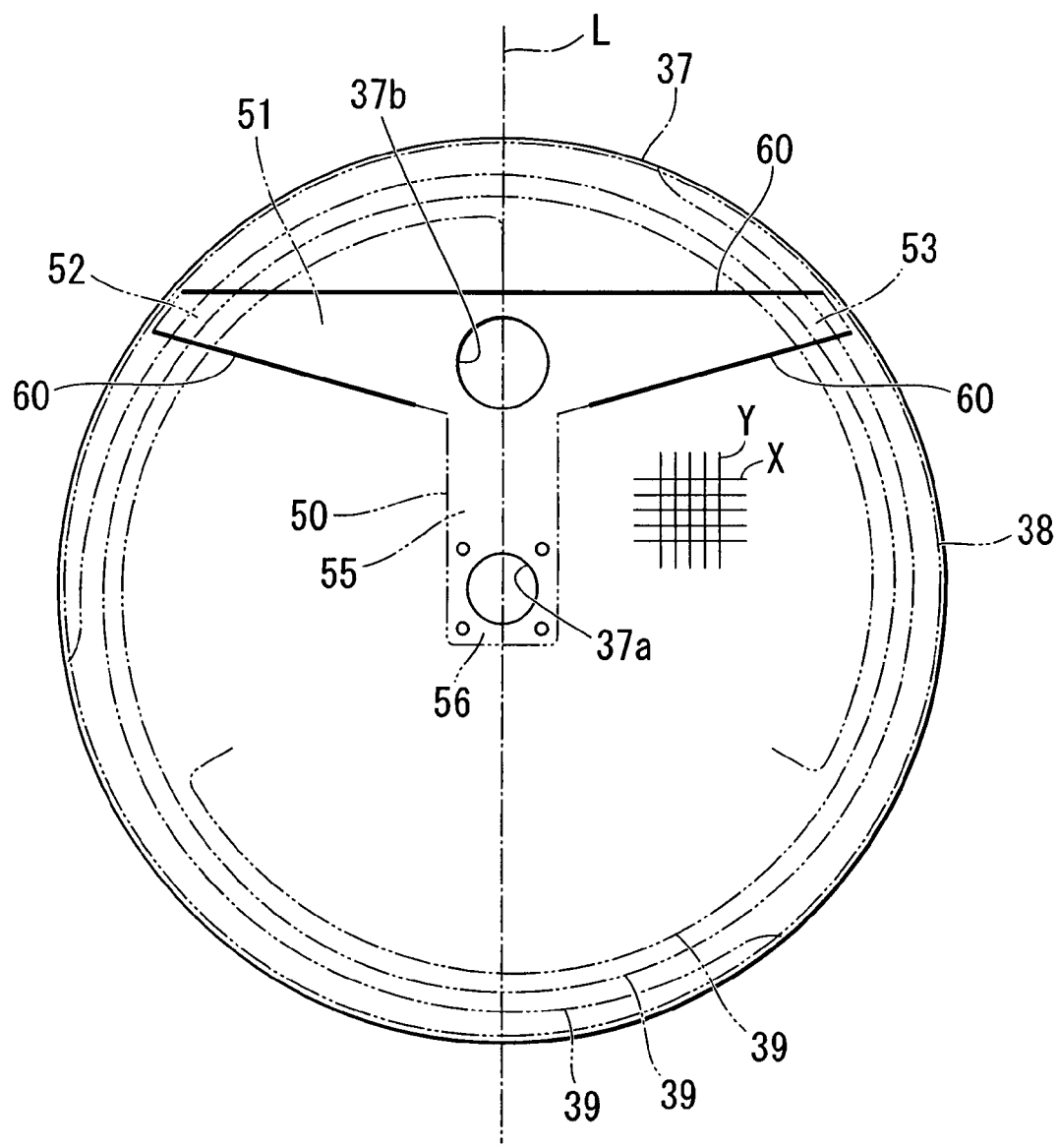
FIG. 10 is a plan view of a second ground fabric of the airbag.

A second positioning means, as shown in FIG. 10, provides positioning lines (marks) 60 in advance by printing, or by other means, in the positions that run along outer edges of the closure part 51 of the vent hole cover 50, on the surface of the second ground fabric 37 on which the vent hole cover 50 is to be mounted. By providing the second positioning means, if the outer edges of the closure part 51 of the vent hole cover 50 are correctly arranged along the positioning lines 60 of the second ground fabric 37 when an operator sees through the first ground fabric 36 or the second ground fabric 37, the fact that both ends 52 and 53 of the closure part 51 are correctly arranged in the positions where the sewing parts 39 are to be formed can be easily confirmed. Also, when both ends are not arranged in proper positions, the position of the vent hole cover 50 can be easily adjusted to a proper position. In addition, a mark, such as a round mark, may be used instead of the positioning lines 60.

Figure 11:
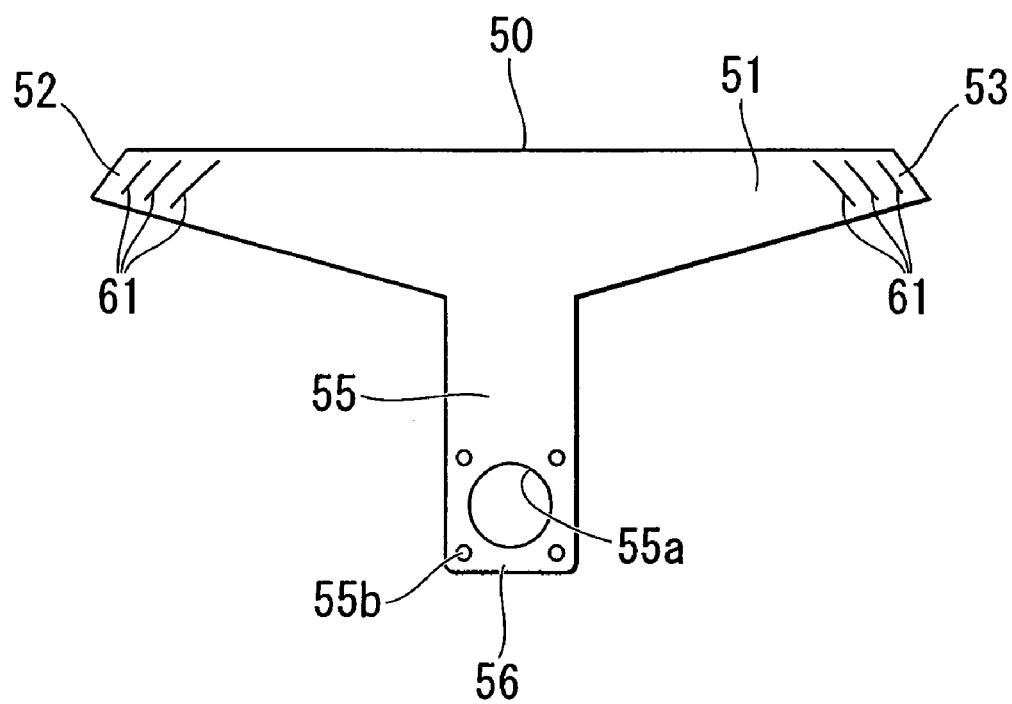
FIG. 11 is a plan view of a vent hole cover.

Third positioning means, as shown in FIG. 11, provides positioning lines (marks) 61 in advance by printing, etc. in the positions where the sewing parts 39 are to be formed, at both ends 52 and 53 of the vent hole cover 50. By providing the third positioning means, if the fact that the positioning lines 61 of the second ground fabric 37 are correctly arranged at the periphery of the closure part 51 of the vent hole cover 50 is confirmed visually when an operator sees through the first ground fabric 36 or the second ground fabric 37, the fact that both ends 52 and 53 of the closure part 51 are correctly arranged in the positions where the sewing parts 39 are to be formed can be easily confirmed. Also, when either of the ends 52 or 53, of the closure part 51 is not arranged in proper position, the position of the vent hole cover 50 can be easily adjusted to a proper position. In addition, a mark, such as a round mark, may be used instead of the positioning lines 61.

Also, the first positioning means, the second positioning means, and the third positioning means may be appropriately combined with one another.

If the positioning means of the vent hole cover 50 is provided in this way, both ends 52 and 53 of the vent hole cover 50 can be easily arranged in proper positions of the second ground fabric 37, and the fact that the vent hole cover 50 is arranged in a proper position can be easily confirmed visually. For this reason, the sewing parts 39 can be formed by reliably placing together and sewing the first ground fabric 36, the second ground fabric 37, and the vent hole cover 50. As a result, the vent hole 37b can be properly closed by the vent hole cover 50, gas can be stably discharged from the vent hole 37b at the time of deployment of the airbag 32 as described below, and a variation in performance can be controlled.

In the airbag apparatus configured in this way, if gravitational acceleration greater than a predetermined value is detected at the time of vehicle collision, the inflator 31 will be ignited and the folded airbag 32 will start inflation by the gas generated by the inflator 31. When the airbag 32 is inflated, the rear cover 19 will be ruptured at the tear lines 19a under the inflation pressure of the airbag, and the airbag 32 will then be deployed towards the interior of a vehicle through an opening formed by the rupture.

Figure 6:
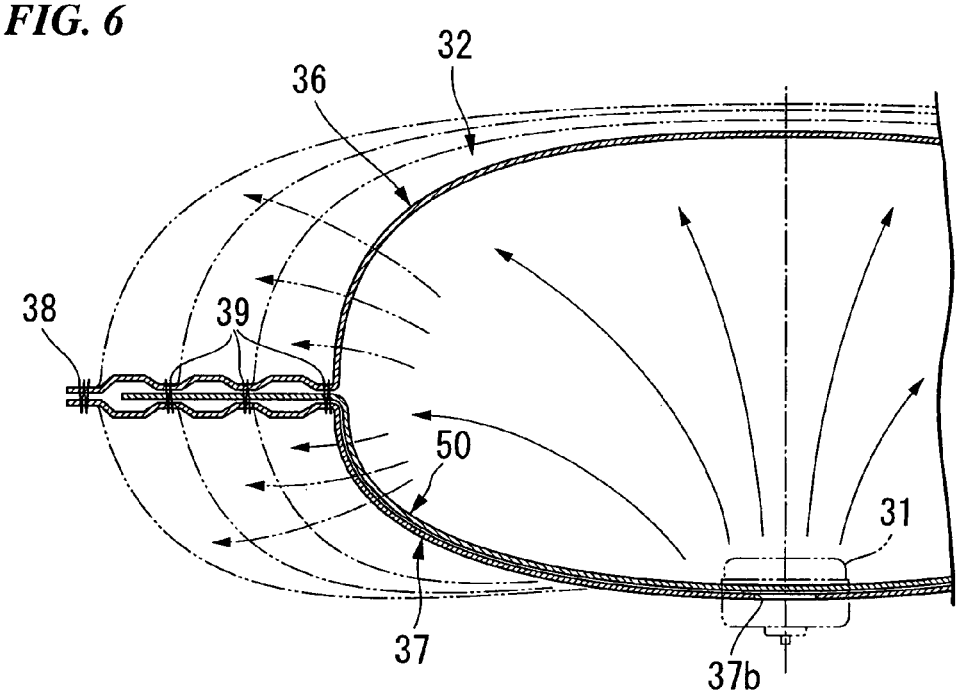
FIG. 6 is a cross-sectional view showing the initial deployment stage of the airbag of the first embodiment.

As shown in FIG. 6, since the three spiral sewing parts 39 join the first ground fabric 36 and the second ground fabric 37 integrally, when the airbag 32 is inflated, the airbag 32 is prevented from being inflated at once. After a small volume of the airbag is formed initially, as the three sewing parts 39 are ruptured outward from the radial inside when the internal pressure of the airbag 32 increases, the airbag 32 can be gradually increased in volume while maintaining proper internal pressure and finally be deployed in a flat shape in the front-and-back direction, thereby exhibiting its maximum constraint force.

Since both ends 52 and 53 of the closure part 51 are constrained by the sewing parts 39 of the first ground fabric 36 and the second ground fabric 37 until all the three sewing parts 39 are ruptured, and the tip 56 of the extending part 55 is sandwiched between the retainer 22 and the stop ring 33, the vent hole cover 50 covers the vent hole 37b to prevent leakage of gas, so that the internal pressure of the airbag 32 can be raised rapidly, and the internal pressure of the airbag can be maintained appropriately.

Figure 7:
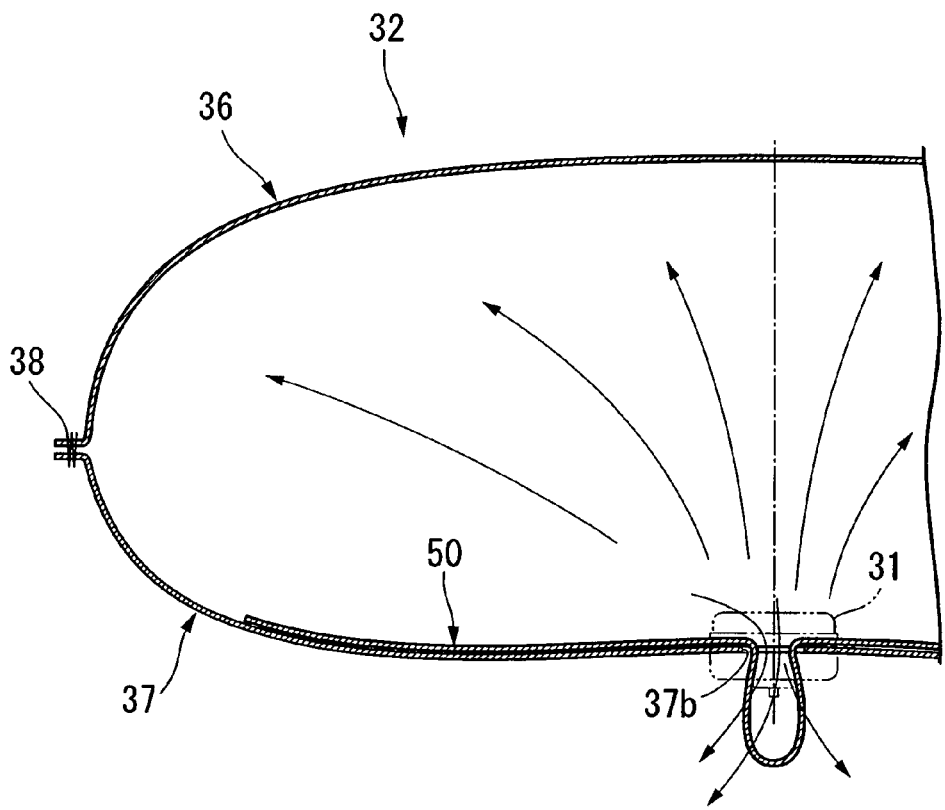
FIG. 7 is a cross-sectional view showing the latter deployment stage of the airbag of the first embodiment.

Also, when all the three sewing parts 39 have been ruptured at the last deployment stage of the airbag 32, although the tip 56 of the extending part 55 is sandwiched and fixed by the retainer 22 and the stop ring 33, the constraint of both ends 52 and 53 of the closure part 51 is released. For this reason, as shown in FIG. 7, the vent hole 37b is opened, by a portion (an upper portion in FIG. 4) of the intermediate part 54 of the closure part 51 in the vent hole cover 50 being extruded to the outside from the vent hole 37b. As a result, the surplus gas in the airbag 32 is discharged from the vent hole 37b, so that an excessive rise in the internal pressure of the airbag 32 can be prevented, and the load characteristics of the airbag 32 can be set as desired. In this case, since the vent hole 37b is provided in the second ground fabric 37, a driver is not directly exposed to the gas discharged from the vent hole 37b, and therefore the driver is not affected by the gas.

Figure 9:
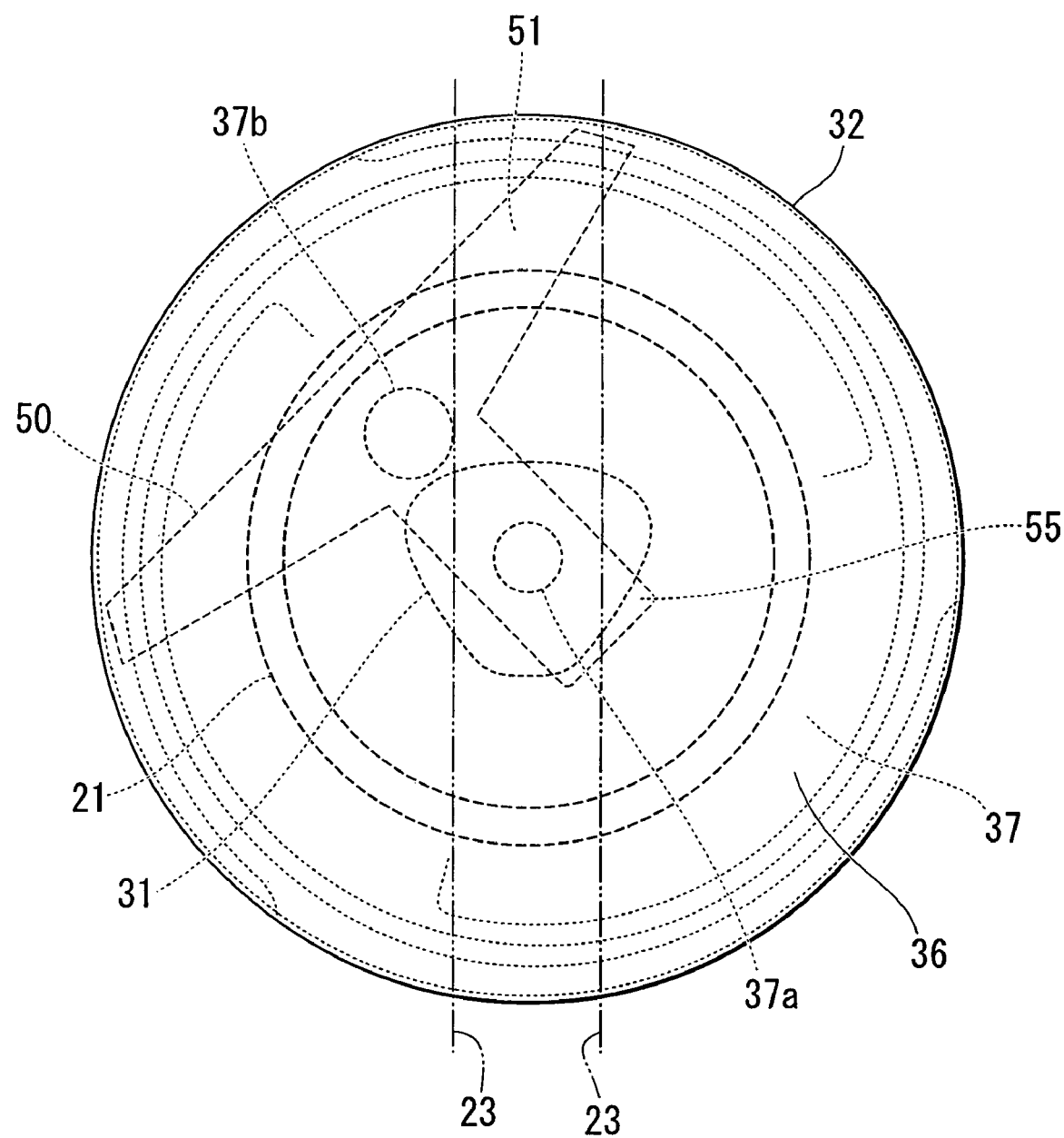
FIG. 9 is a view showing the relative positional relation among the steering wheel, an inflator, and a vent hole at the time of deployment of the airbag.

In addition, as shown in FIG. 9, in the deployed state of the airbag 32, the preferable vent hole 37b location is, outside the deployment locus 23 of the front cover 17, outside the inflator 31, and inside the steering wheel body 21. By configuring the airbag apparatus in this way, it is possible to prevent the vent hole 37b from interfering with the deployed and ruptured front cover 17, interfering with the inflator 31, or interfering with the steering wheel body 21, when the airbag is deployed. For this reason, discharge of air from the vent hole 37b can be performed smoothly and stably, and the load characteristics of the airbag 32 can be stabilized.

Also, in this airbag apparatus, the tip 56 of the extending part 55 is sandwiched between the retainer 22 and the stop ring 33. Thus, it is possible to prevent the intermediate part 54 of the vent hole cover 50 from deviating in position at the time of manufacture of the airbag 32, and it is possible to prevent the intermediate part 54 of the vent hole cover 50 from deviating in position toward the radial outward of the airbag 32 when the airbag 32 is inflated and rounded during deployment of the airbag 32.

Moreover, in the present embodiment, the closure part 51 becomes narrower as it approaches both ends 52 and 53 from its intermediate part 54. Thus, the friction which occurs when the vent hole cover 50 slips out from the vent hole 37b can be reduced.

As a result, closure of the vent hole 37b can be maintained until the sewing parts 39 are ruptured and thereby at least one of the ends 52 and 53 of the closure part 51 of the vent hole cover 50 deviates from the airbag 32, and the vent hole 37b can be opened when at least one of the ends 52 and 53 deviates from the airbag 32. For this reason, the internal pressure of the airbag can be controlled appropriately, and deployment of the airbag 32 can be controlled appropriately.

Also, since the tip 56 of the extending part 55 functions as a reinforcing member which reinforces the second ground fabric 37 around the opening 37a, the periphery of the opening 37a can be reinforced without increasing the number of parts.

Also, at the time of manufacture of an airbag apparatus, the tip 56 of the extending part 55 of the vent hole cover 50 is placed to overlap the center of the second ground fabric 37, the opening 37a and the hole 55a are arranged concentrically, and the bolts 34 are inserted through the through-holes 55b of the vent hole cover 50 and the through-holes 37c of the second ground fabric 37. Accordingly, the vent hole cover 50 can be easily positioned and set in the airbag 32. Therefore, the productivity of the airbag apparatus improves.

In addition, as shown in FIG. 10, it is preferable to arrange weaving directions X and Y of the second ground fabric 37 vertically and parallel to a straight line L connecting the center of the vent hole 37b with the center of the airbag 32 (the center of the opening 37a), respectively. By this configuration, elongation of the second ground fabric 37 can be minimized at the time of deployment of the airbag 32, deformation of the vent hole 37b can be minimized, and discharge of the gas from the vent hole 37b can be stabilized.

Figure 5:
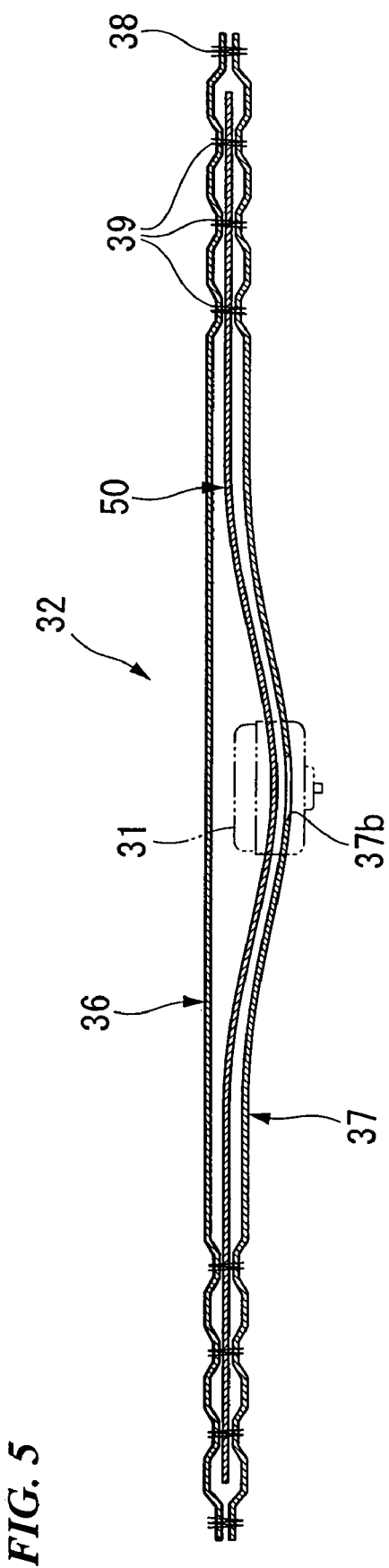
FIG. 5 is a cross-sectional view taken along the line B-B of FIG. 4.

In addition, in the aforementioned embodiment, as shown in FIG. 5 (cross-sectional view taken along the B-B line of FIG. 4), the ends 52 and 53 of the vent hole cover 50 are sewn over a part reaching the outermost of the sewing part 39. However, sewing of the vent hole cover 50 can be stopped at a part of the sewing part 39 further inside than the outermost of the sewing parts 39, for example, at the second sewing part from the inside. By this configuration, the airbag apparatus can be set so that the vent hole 37b may be already opened when the outermost sewing part 39 is ruptured. Accordingly, the opening timing of the vent hole 37b or the internal pressure of the airbag 32 can be adjusted.

Although, in the aforementioned embodiment, the sewing parts 39 are formed spirally, the sewing parts 39 may be formed concentrically, or the sewing parts 39 may be provided at parts of periphery of the airbag 32, instead of the entire periphery of the airbag 32.

In the aforementioned embodiment, the rupture joining parts of the airbag 32 are constituted by the sewing parts 39. However, the rupture joining parts are not limited to be formed by the sewing, and may be formed by weaving, joining, and the like.

The shape of the vent hole cover 50 is not limited to the aforementioned embodiment. The tip 56 of the extending part 55 may be circular, for example.

Moreover, in the aforementioned embodiment, the tip 56 of the extending part 55 of the vent hole cover 50 is arranged so as to cover the periphery of the opening (inflator opening) 37a of the second ground fabric 37, and then fastened together with the retainer 22. However, the tip may be fastened together with the retainer 22 partially around the opening 37a, or may be fixed by any other means than joint fastening with the retainer 22.

Also, although the aspect of an airbag apparatus stored in a steering wheel has been described in the aforementioned embodiment, the present invention can also be applied to airbag apparatuses other than the airbag apparatus stored in a steering wheel.

Hereinafter, second and third embodiments of the airbag apparatus according to the present invention will be described with reference to the drawings of FIGS. 12 to 19. An airbag apparatus of each embodiment described below is an aspect of an airbag apparatus stored in a steering for a driver of a vehicle, and the "front and rear" in the following description is the same as the front and rear in a vehicle body.

Figure 12:
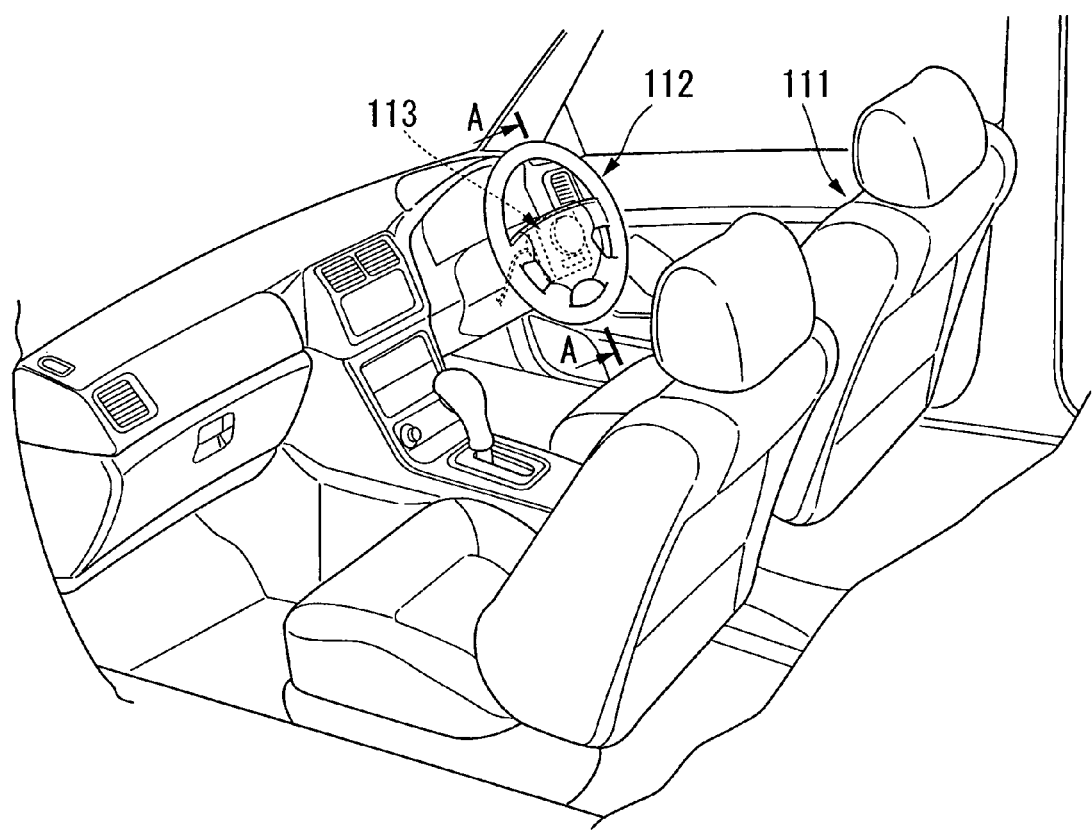
FIG. 12 is a perspective view showing the interior of a vehicle equipped with an airbag apparatus according to the present invention.

As shown in FIG. 12, an airbag module 113 of the airbag apparatus is stored inside a steering wheel 112 arranged in front of a driver's seat 111.

Figure 13:
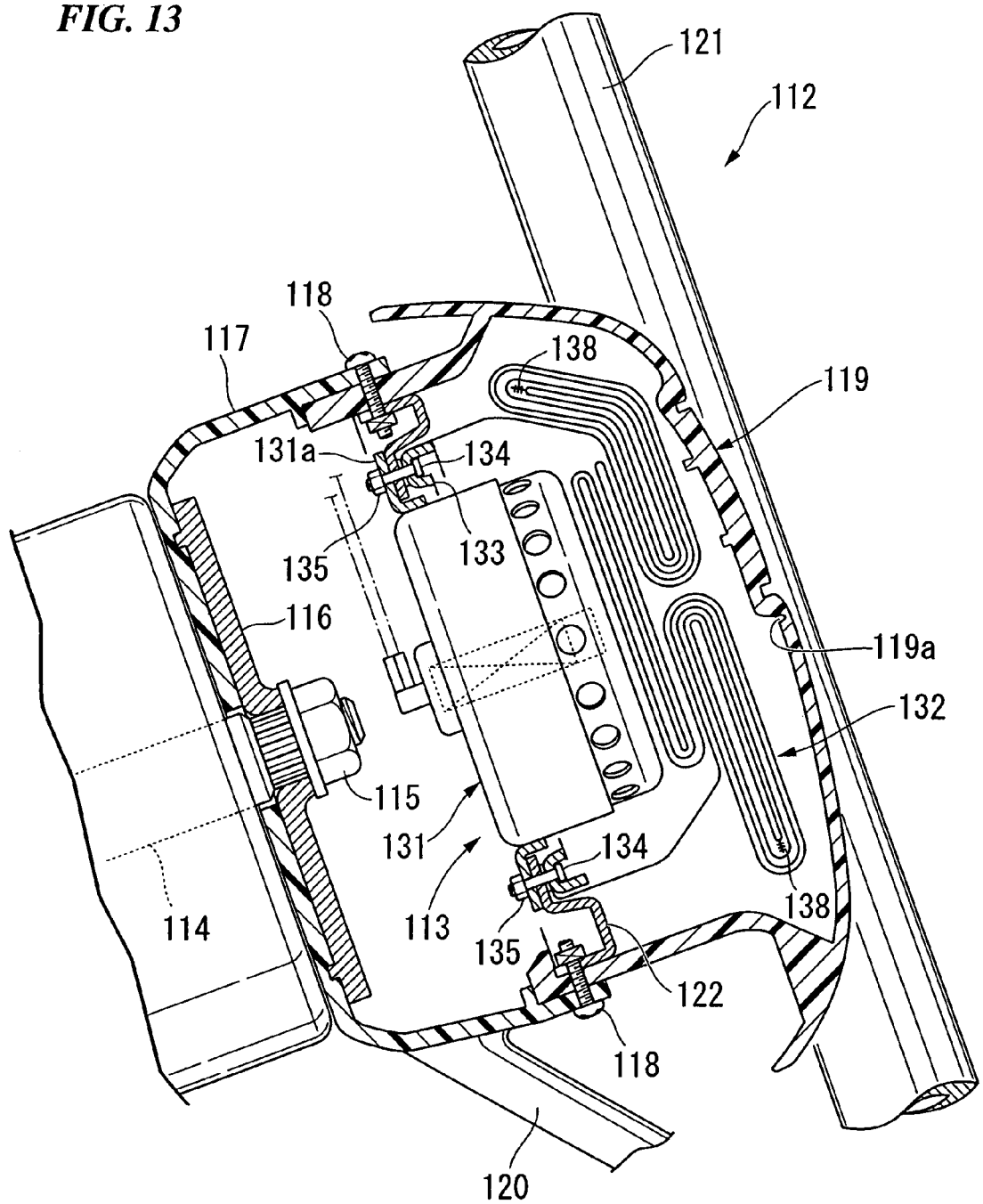
FIG. 13 is a cross-sectional view taken along the line A-A of FIG. 12.

FIG. 13 is a cross-sectional view taken along the line A-A of FIG. 12. As shown in FIG. 13, as for the steering wheel 112, a boss 116 is fixed to a rear end of a steering shaft 114 with a nut 115, and a cup-shaped front cover 117 is fixed to the boss 116. A rear cover 119 is fixed to a peripheral edge of the front cover 117 with a plurality of bolts 118 so as to close the front cover 117. A plurality of radially extending spokes 120 are attached to an outer peripheral surface of the front cover 117, and a steering wheel body 121 is supported by the spokes 120.

A retainer 122 is fastened to an inner peripheral surface of the rear cover 119 with the bolts 118, and the airbag module 113 is supported by the retainer 122. Tear lines 119a for promoting rupture of the rear cover are formed in an inner surface of the rear cover 119.

The airbag module 113 includes an inflator 131 filled with propellant which generates high pressure gas by combustion, an airbag 132 which is constructed by sewing ground fabric, and is inflated by introducing the high pressure gas generated by the inflator 131, and a stop ring 133 which fixes the base of the airbag 132. A flange 131a of the inflator 131 and the stop ring 133 are placed on the front and the rear faces of the retainer 122, respectively, and are fastened to them with a plurality of bolts 134 and nuts 135. The base of the airbag 132 is fixed in a state where it is sandwiched between the rear face of the retainer 122 and the front face of the stop ring 133.

Figure 14:
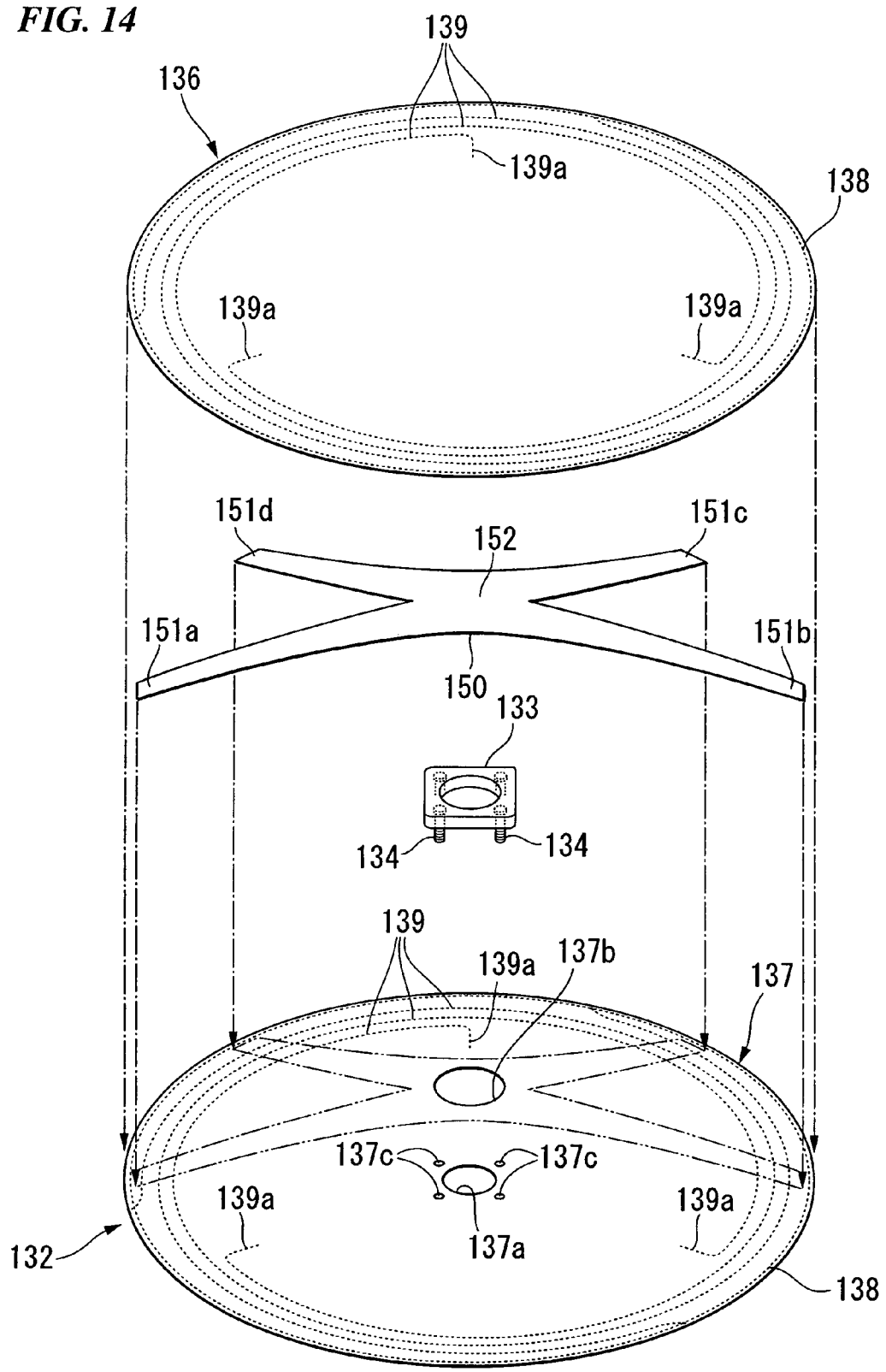
FIG. 14 is an exploded perspective view of an airbag in a second embodiment of the airbag apparatus according to the present invention.

In the second embodiment, as shown in FIG. 14, the circular airbag 132 includes a first ground fabric 136 on the rear side (the side which faces an occupant), and a second ground fabric 137 which is provided on the front face of the first ground fabric, and peripheries of the first ground fabric 136 and the second ground fabric 137 are sewn integrally by sewing parts 138. Also, the layered first ground fabric 136 and second ground fabric 137 are sewn by a plurality of spiral sewing parts (rupture joining parts) 139 inside each sewing part 138. Although three spiral sewing parts 139 are provided in the present embodiment, two or four or more sewing parts may be provided. The peripheral sewing part 138 is securely sewn with a thick thread so that it may not be ruptured at the time of the inflation of the airbag 132, but the three inner spiral sewing parts 139 are weakly sewn with a fine thread so that it can be ruptured at the time of the inflation of the airbag 132.

Radial inner ends 139a of the spiral sewing parts 139 are directed to the center of the airbag 132, and stress is concentrated on the radial inner ends 139a at the time of deployment of the airbag 132 to promote rupture initiation of the sewing parts 139.

The second ground fabric 137 is provided with a circular opening (inflator opening) 137a which surrounds the inflator 131, through-holes 137c, for a plurality of bolts 134, which are formed at the periphery of the opening 137a, and a circular vent hole 137b which allows a portion of internal gas to escape at the time of inflation of the airbag 132. The opening 127a is arranged in the center of the second ground fabric 137, the vent hole 137b is arranged at a side of the opening 137a, and is arranged eccentrically from the center of the second ground fabric 137.

Since the second ground fabric 137 is sandwiched between the rear face of the retainer 122 and the front face of the stop ring 133 and fastened with the plurality of bolts 134 as mentioned above, the gas generated by the inflator 131 is supplied into the airbag 132 from the opening 137a in the center of the second ground fabric 137.

Figure 15:
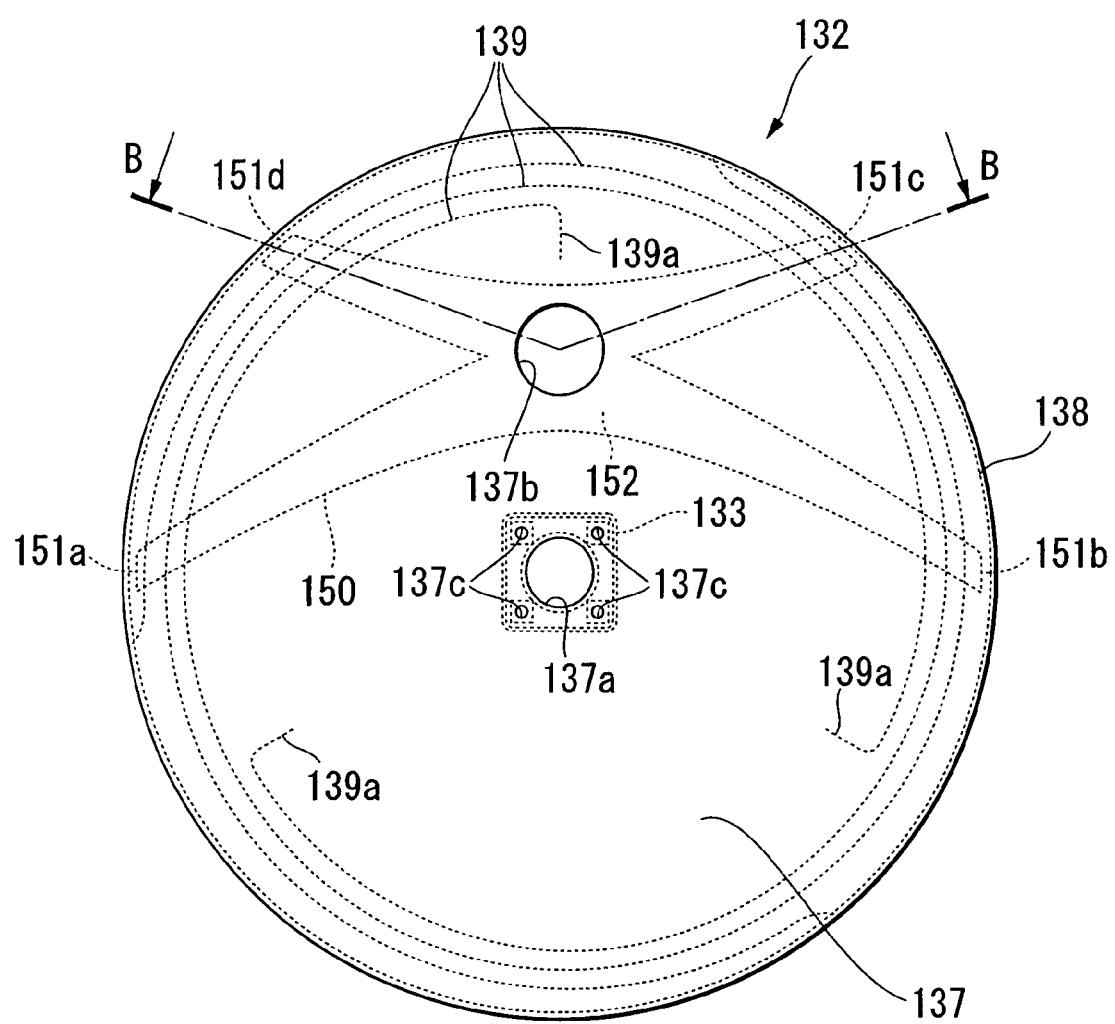
FIG. 15 is a rear view of the airbag in the second embodiment.

The airbag 132 is provided with a vent hole cover 150 which controls the internal pressure thereof. As shown in FIG. 15, the vent hole cover 150 is formed substantially in the shape of the letter "X" in plan view, and includes four ends (apexes) 151*a*, 151*b*, 151*c*, and 151*d*. A central part 152 of the vent hole cover 150 is made wider than the vent hole 137*b* so that it can close the vent hole 137*b*, and the vent hole cover is made narrower as it approaches each of the ends 151*a*, 151*b*, 151*c*, and 151*d* from the central part 152. The vent hole cover 150 is arranged in a position on the inner surface of the second ground fabric 137 where it can close the vent hole 137*b* in the central part 152, and the four ends 151*a*, 151*b*, 151*c*, and 151*d* are cut into arcs so as to align along the peripheral edges of the first ground fabric 136 and the second ground fabric 137, with such a length that they do not reach the sewing parts 138, and they are sewn by three spiral sewing parts 139 which join the first ground fabric 136 and the second ground fabric 137 together.

Describing the relative positional relationship between the vent hole 137*b* and the vent hole cover 150 in detail, the center of the vent hole 137*b* is not located on diagonal lines which connect the ends (151*a* and 151*c*, and 151*b* and 151*d*), which are arranged symmetrically to each other in the vent hole cover 150, but deviates significantly from the intersection point of these diagonal lines. That is, each of the ends 151*a*, 151*b*, 151*c*, and 151*d* of the vent hole cover 150 is provided in a position wherein at least a portion of the vent hole 137*b* deviates from strip-shaped diagonal regions which connect these ends.

Also, the ends 151*a* and 151*b* of the vent hole cover 150 are located on both sides of the inflator opening 137*a*, on a straight line passing through the center of the inflator opening 137*a* (that is, on a diameter portion of the second ground fabric 137 in the present embodiment). In other words, the center of the inflator opening 137*a* is arranged in a position equidistant from the ends 151*a* and 151*b* on a straight line connecting the two adjacent ends 151*a* and 151*b* in the vent hole cover 150.

In addition, after the peripheries of the first ground fabric 136 and the second ground fabric 137 are joined together at the sewing parts 138, the airbag 132 is turned inside out, and then the insides of the sewing parts 138 are joined at the spiral sewing parts 139. In this case, in order for the vent hole cover 150 not to deviate in position when the airbag is turned inside out, the vent hole cover 150 may be temporarily fixed to the second ground fabric 137 in accordance with a proper position where the vent hole 137*b* is closed, before the airbag is turned inside out.

In the airbag apparatus configured in this way, if gravitational acceleration greater than a predetermined value is detected at the time of a vehicle collision, the inflator 131 will be ignited and the folded airbag 132 will start inflation by the gas generated by the inflator 131. When the airbag 132 is inflated, the rear cover 119 will be ruptured at the tear lines 119*a* under the inflation pressure of the airbag, and the airbag 132 will then be deployed towards the interior of a vehicle through an opening formed by the rupture.

Figure 17:
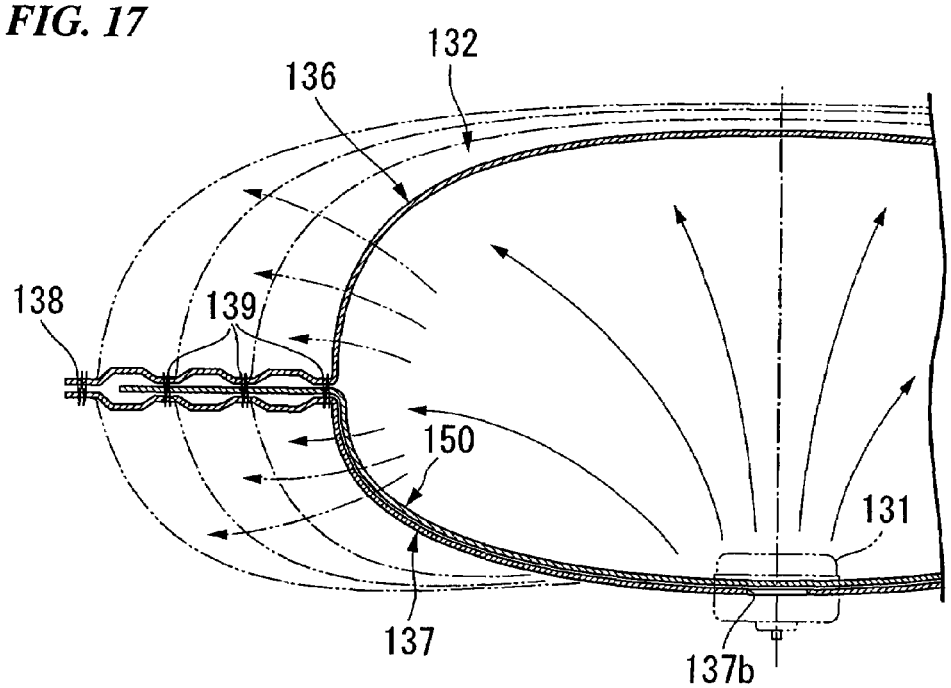
FIG. 17 is a cross-sectional view showing the initial deployment stage of the airbag of the second embodiment.

As shown in FIG. 17, since the three spiral sewing parts 139 join the first ground fabric 136 and the second ground fabric 137 integrally when the airbag 132 is inflated, the airbag 132 is prevented from being inflated at once. After a small volume of the airbag is formed initially, as the three sewing parts 139 are ruptured outward from the radial inside when the internal pressure of the airbag 132 increases, the airbag 132 can be gradually increased in volume while maintaining proper internal pressure and finally deployed into a shape that is flat in the front-and-back direction, thereby exhibiting its maximum constraint force.

Since the ends 151*a*, 151*b*, 151*c*, and 151*d* of the vent hole cover 150 are constrained by the sewing parts 139 of the first ground fabric 136 and the second ground fabric 137 until all the three sewing parts 139 are ruptured, the vent hole cover 150 covers the vent hole 137*b* to prevent leakage of gas, so that the internal pressure of the airbag 132 can be raised rapidly, and the internal pressure of the airbag can be maintained appropriately.

Figure 18:
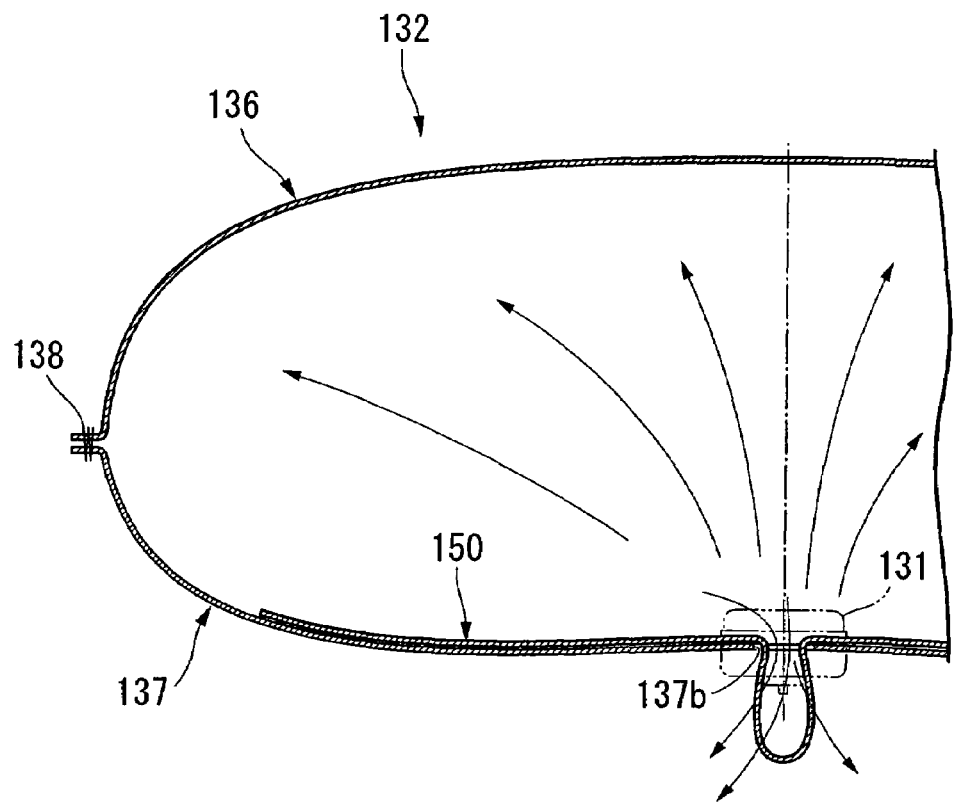
FIG. 18 is a cross-sectional view showing the latter deployment stage of the airbag of the second embodiment.

Also, when all the three sewing parts 139 are ruptured at the last deployment stage of the airbag 132, the constraint of the ends 151*a*, 151*b*, 151 *c*, and 151*d* of the vent hole cover 150 will be released as shown in FIG. 18. Therefore, the vent hole 137*b* is opened by a portion of the vent hole cover 150 being extruded to the outside from the vent hole 137*b*. As a result, the surplus gas in the airbag 132 is discharged from the vent hole 137*b*, so that an excessive rise in the internal pressure of the airbag 132 can be prevented. In this case, since the vent hole 137*b* is provided in the second ground fabric 137, a driver is not directly exposed to the gas discharged from the vent hole 137*b*, and therefore the driver is not affected by the gas.

Also, in this airbag apparatus, the four ends 151*a*, 151*b*, 151 *c*, and 151*d* of the vent hole cover 150 are joined to the airbag 132 at the sewing parts 139. Thus, it is possible to prevent the intermediate part 152 of the vent hole cover 150 from deviating in position at the time of manufacture of the airbag 132, and it is possible to prevent the intermediate part 152 of the vent hole cover 150 from deviating in position to the radial outside of the airbag 132 even when the airbag 132 is inflated into a round shape during deployment of the airbag 132.

In particular, in the present embodiment, the ends 151*a* and 151*b* of the vent hole cover 150 are located on both sides of the inflator opening 137*a* on a straight line passing through the center of the inflator opening 137*a*. Thus, deviation of the vent hole cover 150 in a direction intersecting the straight line passing through the inflator opening 137*a* can be minimized. In addition, as long as the object of minimizing deviation of the vent hole cover 150 in a direction intersecting a straight line passing through the inflator opening 137*a* can be attained, the ends 151*a* and 151*b* may be slightly misaligned with respect to a straight line passing through the center of the inflator opening 137*a*. That is, the ends 151*a* and 151*b* are arranged substantially on a straight line passing through the center of the inflator opening 137*a*.

Also, since the vent hole cover 150 becomes narrower as it approaches the ends 151*a*, 151*b*, 151*c*, and 151*d* from its intermediate part 152, the friction which occurs when the vent hole cover 150 slips out from the vent hole 137*b* can be reduced.

Also, as mentioned above, each of the ends 151*a*, 151*b*, 151*c*, and 151*d* of the vent hole cover 150 is provided in a position where at least a portion of the vent hole 137*b* deviates from strip-shaped diagonal regions which connect these ends (151*a* and 151*c*, and 151*b* and 151*d*). Thus, when at least one of the four ends 151*a*, 151*b*, 151*c*, and 151*d* of the vent hole cover 150 deviates from the airbag 132, the vent hole 137*b* can be opened. Therefore, the vent hole 137*b* can be reliably opened with suitable timing.

As a result, closure of the vent hole 137*b* can be maintained until the sewing parts 139 are ruptured and thereby at least one of the ends 151*a* 151*b*, 151*c*, and 151*d* of the vent hole cover 150 deviates from the airbag 132, and the vent hole 137*b* can be opened when at least one of the ends 151*a*, 151*b*, 151 *c*, and 151*d* of the vent hole cover 150 deviates from the airbag 132. Thus, the internal pressure of the airbag can be controlled appropriately and deployment of the airbag 132 can be controlled appropriately.

Figure 19:
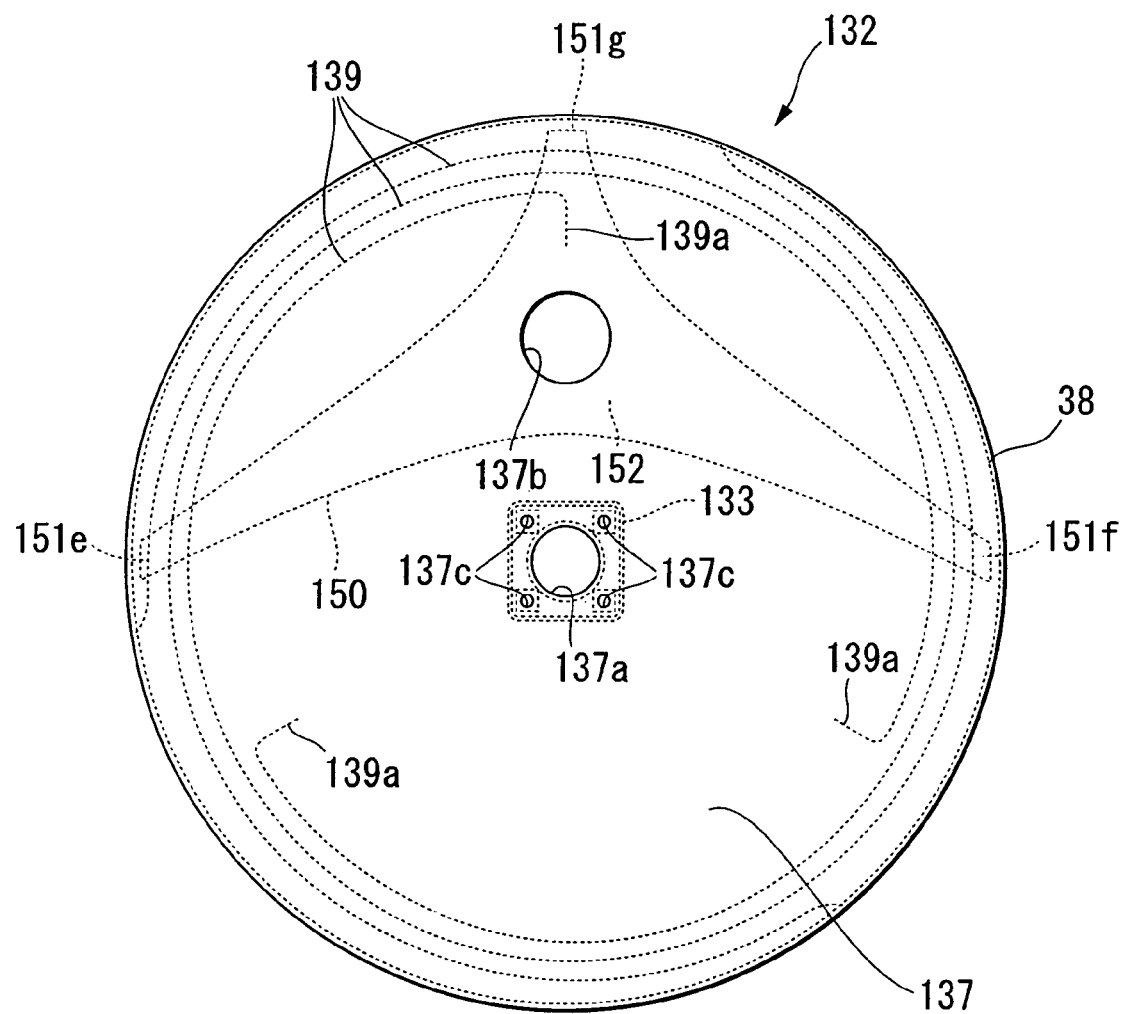
FIG. 19 is a rear view of an airbag in a third embodiment of the airbag apparatus according to the present invention.

FIG. 19 shows a third embodiment in which the vent hole cover 150 is formed in the shape of an inverted letter "Y".

Since configurations other than the vent hole cover 150 are the same as those of the aforementioned second embodiment, description thereof is omitted, and only the vent hole cover 150 will be described.

This vent hole cover 150 has three ends (apex) 151e, 151f, and 151g. A central part 152 of the vent hole cover 150 is made wider than the vent hole 137b so that it can cover the vent hole 137b, and the vent hole cover 150 becomes narrows as it approaches the ends 151e, 151f, and 151g from the central part 152. These ends 151e, 151f, and 151g are sewn at the three spiral sewing parts 139 which join the first ground fabric 136 and the second ground fabric 137. Since the vent hole cover 150 becomes narrower as it approaches 151e, 151f, and 151g from its central part 151, the friction which occurs when the vent hole cover 150 slips out from the vent hole 137b can be reduced.

The relative positional relationship between the vent hole 137b and the vent hole cover 150 will be described below in detail. The center of the vent hole 137b is not located in strip-shaped straight regions which connect the adjacent ends (151e and 151f, 151f and 151g, and 151g and 151e) in the vent hole cover 150. This configuration is provided so that the vent hole 137b can be opened even when at least one of the three ends 151e, 151f, and 151g of the vent hole cover 150 deviates from the airbag 132.

Also, the ends 151e and 151f of the vent hole cover 150 are located on both sides of the inflator opening 137a on the straight line passing through the center of the inflator opening 137a (that is, on a straight line of the second fabric 137 in the second embodiment), so that the deviation of the vent hole cover 150 in a direction intersecting the straight line can be minimized. In other words, the center of the inflator opening 137a is arranged in a position equidistant from the ends 151e and 151f on a straight line connecting the two adjacent ends 151e and 151f in the vent hole cover 150. In addition, the end 151g is arranged on a straight line connecting the opening 137a and the vent hole 137b.

In the airbag apparatus shown in FIG. 19, the three ends 151e, 151f, and 151g of the vent hole cover 151 are joined to the airbag 132 at the sewing parts 139. Thus, it is possible to prevent the central part 152 of the vent hole cover 150 from deviating in position at the time of manufacture of the airbag 132, and it is possible to prevent the central part 152 of the vent hole cover 150 from deviating in position to the radial outside of the airbag 132 even when the airbag 132 is inflated in a round shape during deployment of the airbag 132. As a result, closure of the vent hole 137b can be maintained until the sewing parts 139 are ruptured and thereby at least one of the ends 151e, 151f, and 151g of the vent hole cover 150 deviates from the airbag 132. Accordingly, the internal pressure of the airbag can be controlled appropriately, and deployment of the airbag 132 can be controlled appropriately.

Figure 16:
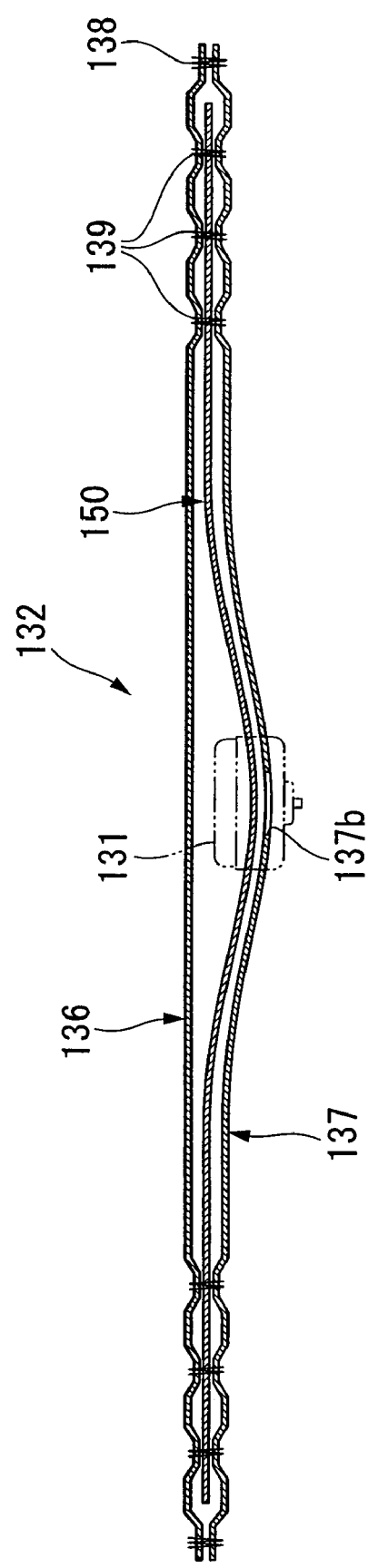
FIG. 16 is a cross-sectional view taken along the line B-B of FIG. 15.

In addition, in the aforementioned embodiment, as shown in FIG. 16 (cross-sectional view taken along the B-B line of FIG. 15), the ends 151a to 151g of the vent hole cover 150 are sewn over a part reaching the outermost of the sewing part 139. However, sewing of the vent hole cover 150 can be stopped at a part of the sewing part 139 further inside than the outermost of the sewing parts 139, for example, at the second sewing part from the inside. By this configuration, the airbag apparatus can be set so that the vent hole 137b may be already opened when the outermost sewing part 139 is ruptured. Accordingly, the opening timing of the vent hole 137b or the internal pressure of the airbag 132 can be adjusted.

Although, in the aforementioned embodiment, the sewing parts 139 are formed spirally, the sewing parts 139 may be formed concentrically, or the sewing parts 139 may be provided at parts of periphery of the airbag 132, instead of the entire periphery of the airbag 132.

The shape of the vent hole cover 150 is not limited to the aforementioned embodiment, and the number of the ends (apexes) to be joined to the airbag 132 may be arbitrary so long as it is three or more.

In the aforementioned embodiment, the rupture joining parts of the airbag 132 are constituted by the sewing parts 139. However, the rupture joining parts are not limited to be formed by the sewing, and may be formed by weaving, joining, and the like.

Also, although the aspect of an airbag apparatus stored in a steering wheel has been described in the aforementioned embodiment, the present invention can also be applied to airbag apparatuses other than the airbag apparatus stored in a steering wheel.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An airbag apparatus comprising an airbag, the airbag comprising:
    an inflator opening;
    a vent hole provided at a side of the inflator opening; and
    a vent hole cover which closes the vent hole, wherein
    the vent hole cover has a strip-shaped closure part which covers the vent hole, and an extending part which extends towards the inflator opening from a longitudinal intermediate part of the closure part, and both ends of the closure part are joined to the airbag at rupture joining parts which are configured to rupture at the time of deployment of the airbag; and
    a positioning mechanism for positioning the vent hole cover with respect to the airbag when both ends of the closure part are joined to the airbag; and
    wherein the positioning mechanism is configured by making the color of the airbag different from the color of the vent hole cover.

2. The airbag apparatus according to claim 1, wherein the extending part covers the periphery of the inflator opening.

3. The airbag apparatus according to claim 1, wherein the ends of the closure part are made narrower at the rupture joining parts, than the center part of the closure part.

4. The airbag apparatus according to claim 1, wherein the positioning mechanism has marks provided in parts of the airbag where the vent hole cover is to be arranged.

5. The airbag apparatus according to claim 1, wherein the positioning mechanism has marks provided in the vicinity of the ends of the vent hole cover.

6. The airbag apparatus according to claim 1, further comprising:
    an airbag cover which stores the airbag in a folded state,
    wherein the vent hole is formed in a position where the vent hole does not interfere with a deployment locus of the airbag cover in a deployed state of the airbag.

7. The airbag apparatus according to claim 1,
wherein the airbag is provided in a steering wheel of a vehicle, and the vent hole is located inside a grip of the steering wheel in a deployed state of the airbag.

8. An airbag apparatus comprising an airbag, the airbag comprising:
an inflator opening;
a vent hole provided at a side of the inflator opening; and
a vent hole cover which closes the vent hole, wherein said vent hole cover comprises a substantially T-shaped member having a first strip-shaped closure part which covers the vent hole, and a second extending part which extends towards the inflator opening from a longitudinally intermediate part of said closure part, and both ends of the closure part are joined to the airbag at rupture joining parts which are configured to rupture at the time of deployment of the airbag.

9. The airbag apparatus according to claim 8, wherein said second extending part has a first end that covers the periphery of the inflator opening and a second end that connects to said first strip-shaped closure part.

10. The airbag apparatus according to claim 8, wherein the distal ends of said first strip-shaped closure part are made narrower at the rupture joining parts, than the center part of the closure part.

11. The airbag apparatus according to claim 8, further comprising a positioning mechanism which has marks provided in parts of the airbag where the vent hole cover is to be arranged.

12. The airbag apparatus according to claim 8, further comprising a positioning mechanism which has marks provided in the vicinity of the ends of the vent hole cover.

\* \* \* \* \*